July 7, 1964

V. R. BAILEY ETAL 3,139,791

COMPOSING MACHINE

Filed Jan. 10, 1961

*INVENTORS*
**VINCENT R. BAILEY &
ROBERT H. ISENHOWER**
BY
Busser, Smith & Harding

ATTORNEYS

July 7, 1964  V. R. BAILEY ETAL  3,139,791
COMPOSING MACHINE
Filed Jan. 10, 1961  13 Sheets-Sheet 6

INVENTORS
VINCENT R. BAILEY &
ROBERT H. ISENHOWER
BY

ATTORNEYS

FIG. 7

July 7, 1964  V. R. BAILEY ETAL  3,139,791
COMPOSING MACHINE

Filed Jan. 10, 1961  13 Sheets-Sheet 8

INVENTORS
VINCENT R. BAILEY &
ROBERT H. ISENHOWER
BY

ATTORNEYS

July 7, 1964 V. R. BAILEY ETAL 3,139,791
COMPOSING MACHINE

Filed Jan. 10, 1961 13 Sheets-Sheet 10

INVENTORS
VINCENT R. BAILEY &
ROBERT H. ISENHOWER
BY

ATTORNEYS

FIG. 15.

INVENTORS
VINCENT R. BAILEY &
ROBERT H. ISENHOWER
BY
Busser, Smith & Harding
ATTORNEYS July 7, 1964    V. R. BAILEY ETAL    3,139,791
COMPOSING MACHINE Filed Jan. 10, 1961    13 Sheets-Sheet 12

INVENTORS
VINCENT R. BAILEY &
ROBERT H. ISENHOWER
BY
Russell, Smith & Harding
ATTORNEYS July 7, 1964

V. R. BAILEY ETAL 3,139,791

COMPOSING MACHINE

Filed Jan. 10, 1961

INVENTORS
VINCENT R. BAILEY &
BY ROBERT H. ISENHOWER

ATTORNEYS

United States Patent Office 3,139,791
Patented July 7, 1964

3,139,791
COMPOSING MACHINE
Vincent R. Bailey, Palm Beach, and Robert H. Isenhower, Ocala, Fla., assignors to Perry Printing Process Company, Ocala, Fla., a corporation of Florida
Filed Jan. 10, 1961, Ser. No. 81,738
6 Claims. (Cl. 88—24)

This invention relates generally to composing machines and particularly to an improved machine for projecting upon sensitized paper adapted for being developed for use in making engravings a composition which is a faithful reproduction of an artist's layout.

When a printed advertisement is produced, for example, for a page of a newspaper, the artist makes a layout of his conception, and the photosetter makes a film negative from the artist's layout. The photosetter must have regard for the style and size of each character called for by the artist, in consequence of which the photosetter must use a different font of type for each size of print called for. Obviously, this is inconvenient and expensive. Accordingly, an important object of the invention is to provide a machine that is capable of reproducing an artist's conception calling for a number of different sizes of print on sensitized paper from a film negative made by using only one size of type at the photosetting machine.

Other objects of the invention will become apparent when the following specification is read with reference to the accompanying drawings, in which.

Figure 1:
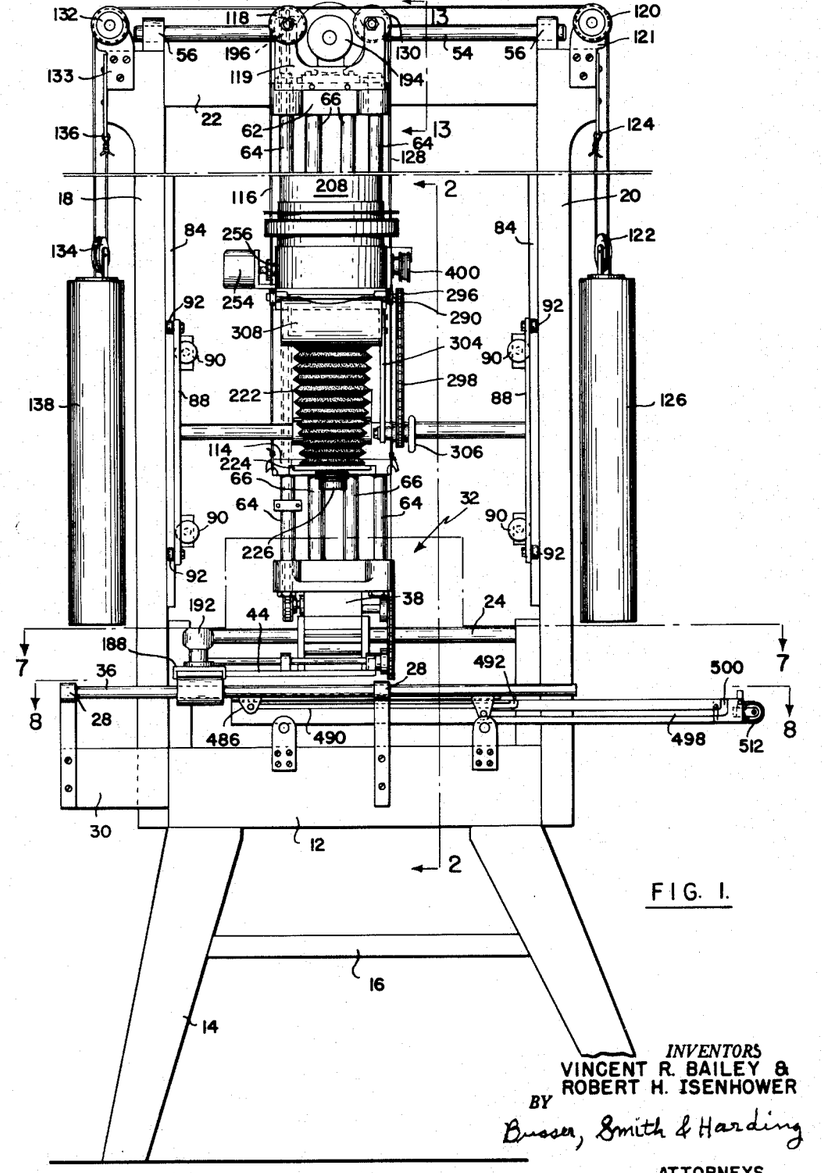
FIGURE 1 is a front elevation of a machine constructed in accordance with the invention.

Referring particularly to FIGURE 1, the apparatus constructed in accordance with the invention comprises a rigid frame including a base section having a horizontally extending top 12 supported upon legs 14, the latter being braced, as at 16. Extending upwardly respectively from opposite sides of the top 12 are a pair of side frames 18 and 20 carrying a cross-beam 22.

Figure 7:
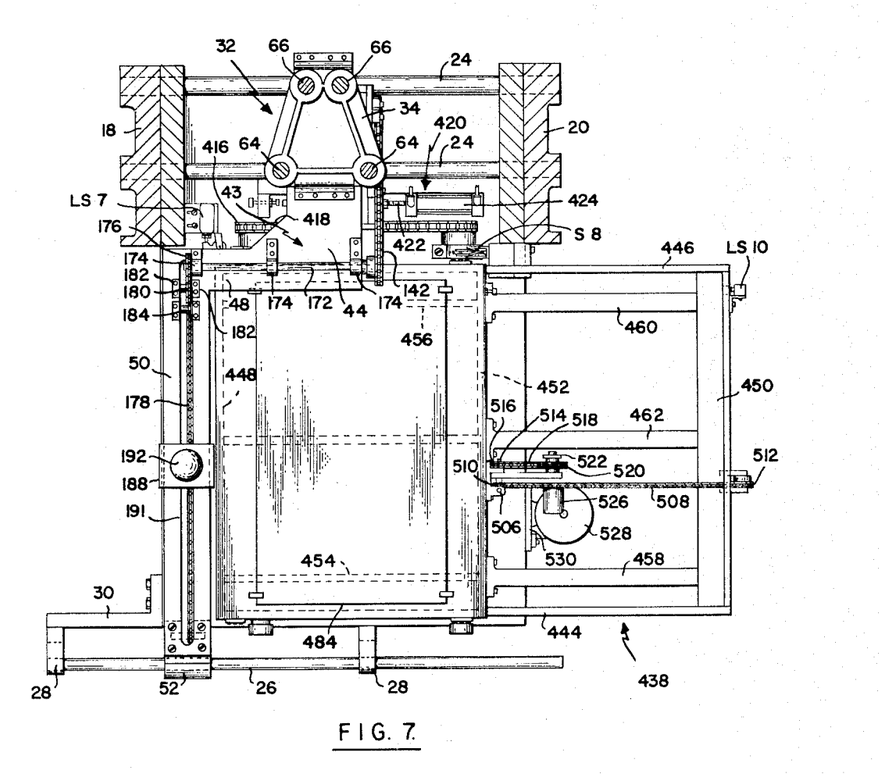
FIGURE 7 is a horizontal section on the plane indicated by line 7—7 of FIGURE 1, showing the cover of the machine in closed position.

Referring particularly to FIGURE 7, the side frames 18 and 20 carry a pair of horizontally extending laterally spaced bars 24. Extending across the front of the apparatus is a horizontally extending bar 26 affixed by a pair of axially spaced brackets 28 and a bracket 30 to the top 12. Carried by bars 24 and 26 is a carriage unit, generally designated 32, which unit is provided with a lower carriage section having a part 34 (see FIGURE 2) fitted with a pair of horizontally extending laterally spaced sleeve bushings 36. Extending upwardly at the front end of the part 34 is a wall 38 (see FIGURE 1), and extending upwardly from the rear end of the part 34 is a wall 40 (see FIGURE 4). Overlying the walls 38 and 40 is a part 42 for a purpose to appear.

Figure 2:
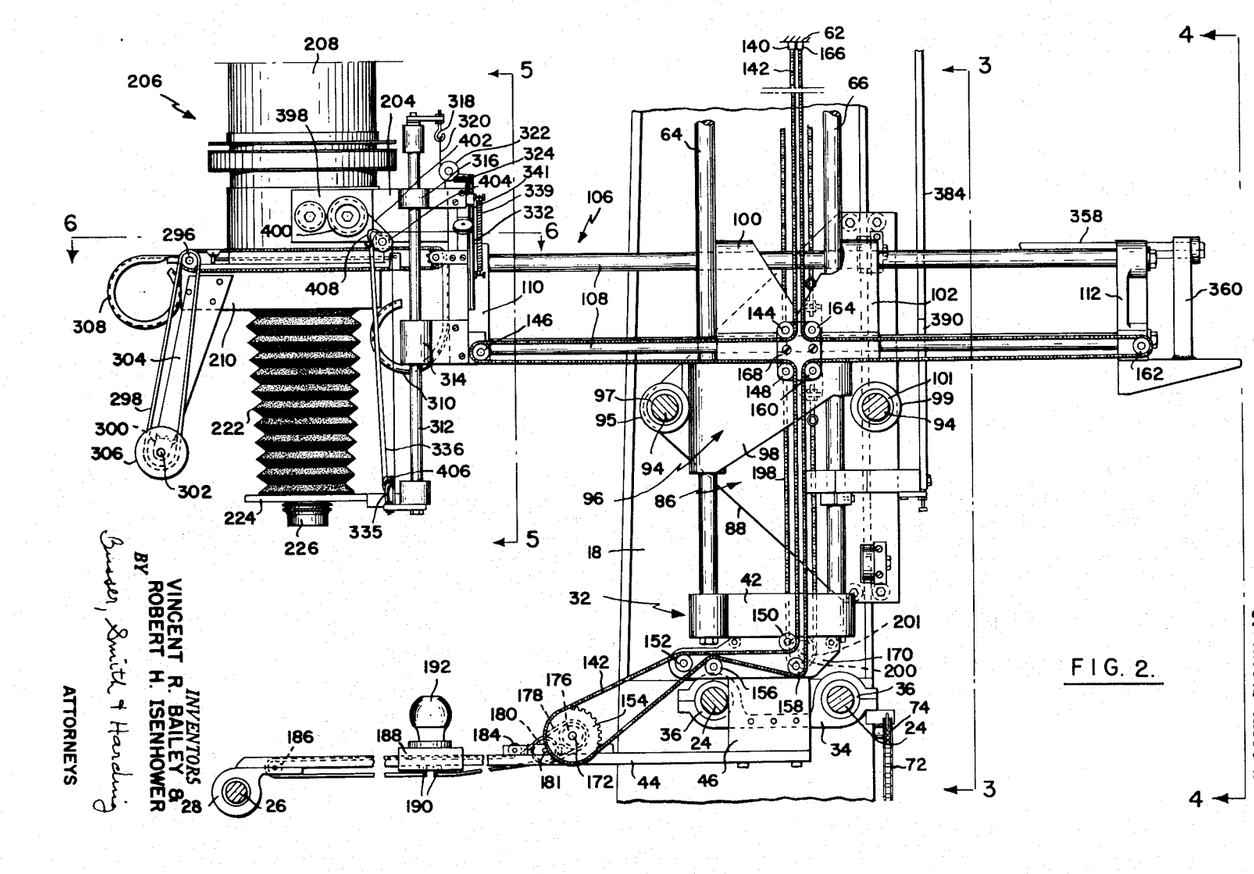
FIGURE 2 is an enlarged vertical section on the plane indicated by line 2—2 of FIGURE 1.

Referring to FIGURES 1, 2 and 7, disposed in overlying relation to the top 12 is a horizontally extending Z-shaped plate, generally designated 43. A generally rectangular area 44 of the plate 43 is affixed to the carriage part 34 by means of a pair of upright brackets 46. Extending laterally from the plate area 44 is a short arm 48, and extending forwardly from the arm 48 is a comparatively long arm 50 terminating in a sleeve bearings 52 slidably fitted over the bar 26.

Figure 13:
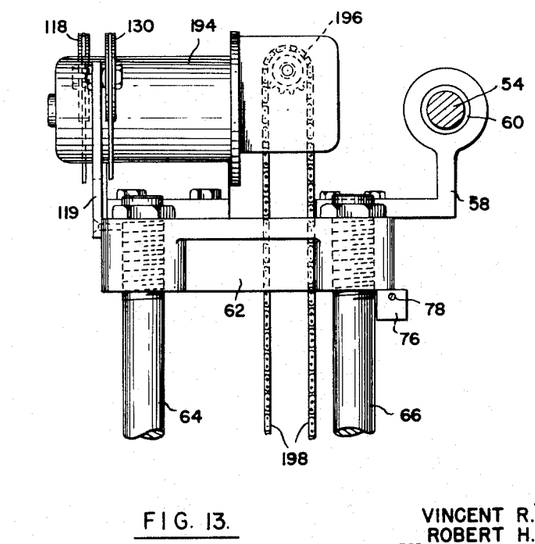
FIGURE 13 is an enlarged vertical section on the plane indicated by line 13—13 of FIGURE 1.
Figure 14:
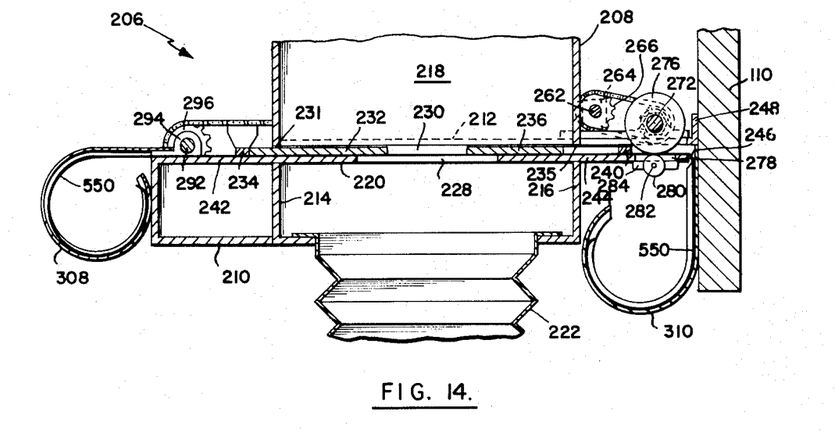
FIGURE 14 is an enlarged vertical section on the plane indicated by line 14—14 of FIGURE 6.

Referring particularly to FIGURES 1 and 13, extending across the top of the apparatus is a bar 54 having opposite end portions affixed by brackets 56 respectively to side frames 18 and 20. The unit 32 is also provided with an upper carriage section having a part 58 provided with a horizontally extending sleeve bushing 60 fitted over bar 54. Affixed to the carriage part 58 is a horizontally extending part 62. Interconnecting the vertically spaced parts 62 and 42 are a set of two upright laterally spaced bars 64 and a pair of upright laterally spaced bars 66. The bars 64 are positioned forwardly of the bars 66 and are spaced farther apart than the bars 66.

Figure 4:
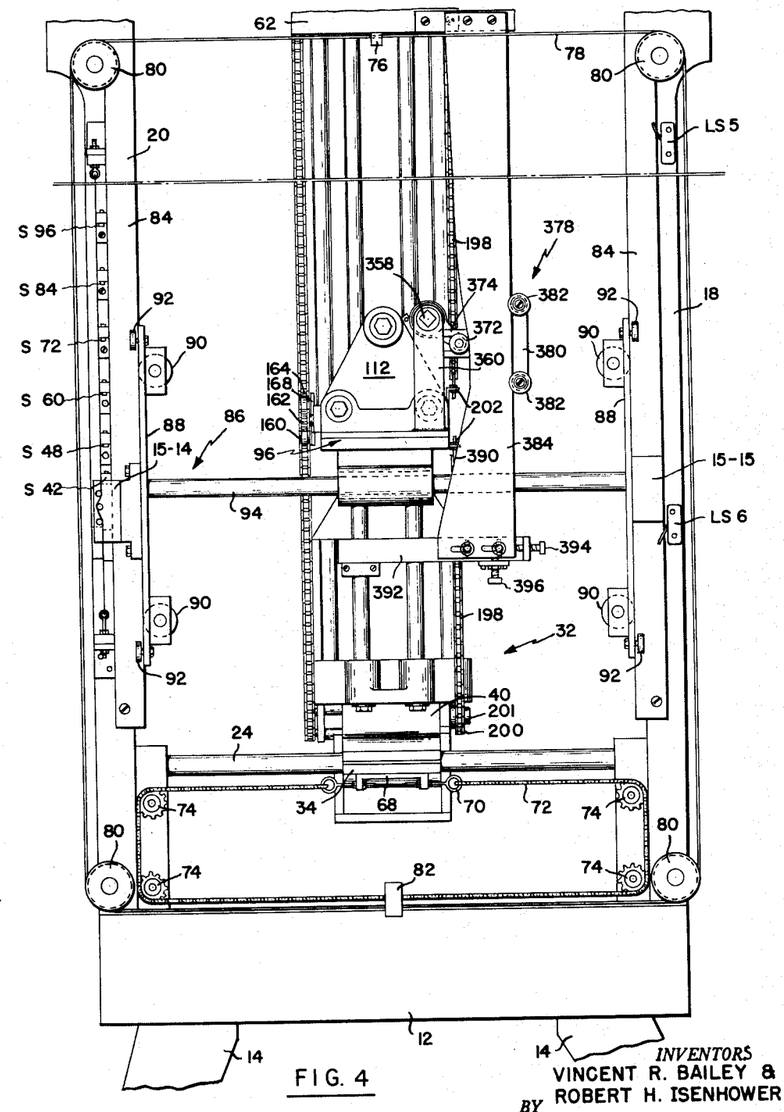
FIGURE 4 is a rear elevation of the machine.

Referring particularly to FIGURE 4, affixed to the part 34 is a bracket 68, and anchored to the latter, as by a pair of eye bolts 70, are the opposite end portions of a chain 72, which chain is trained over a set of four sprockets 74 carried by the side frames 18 and 20. Affixed to the carriage part 62, as at 76, are the opposite end portions of a cable 78, which cable is trained over a set of four pulleys 80 carried by the side frames 18 and 20. The cable 78 and the chain 72 are affixed to one another, as at 82.

Referring particularly to FIGURES 1, 2 and 4, mounted upon the side frames 18 and 20 respectively are a pair of upright rails 84 for a carriage unit generally designated 86. At each end of the carriage unit is an upright plate 88 close adjacent the associated rail 84. The plate is fitted with a pair of rollers 90 which engage the narrow edge of the rail 84, and with a set of four rollers 92 engaging opposite sides of the rail 84. Extending between the plates 88 are a pair of horizontally extending laterally spaced bars 94 each of which has opposite end portions affixed respectively to the plates 88.

Figure 3:
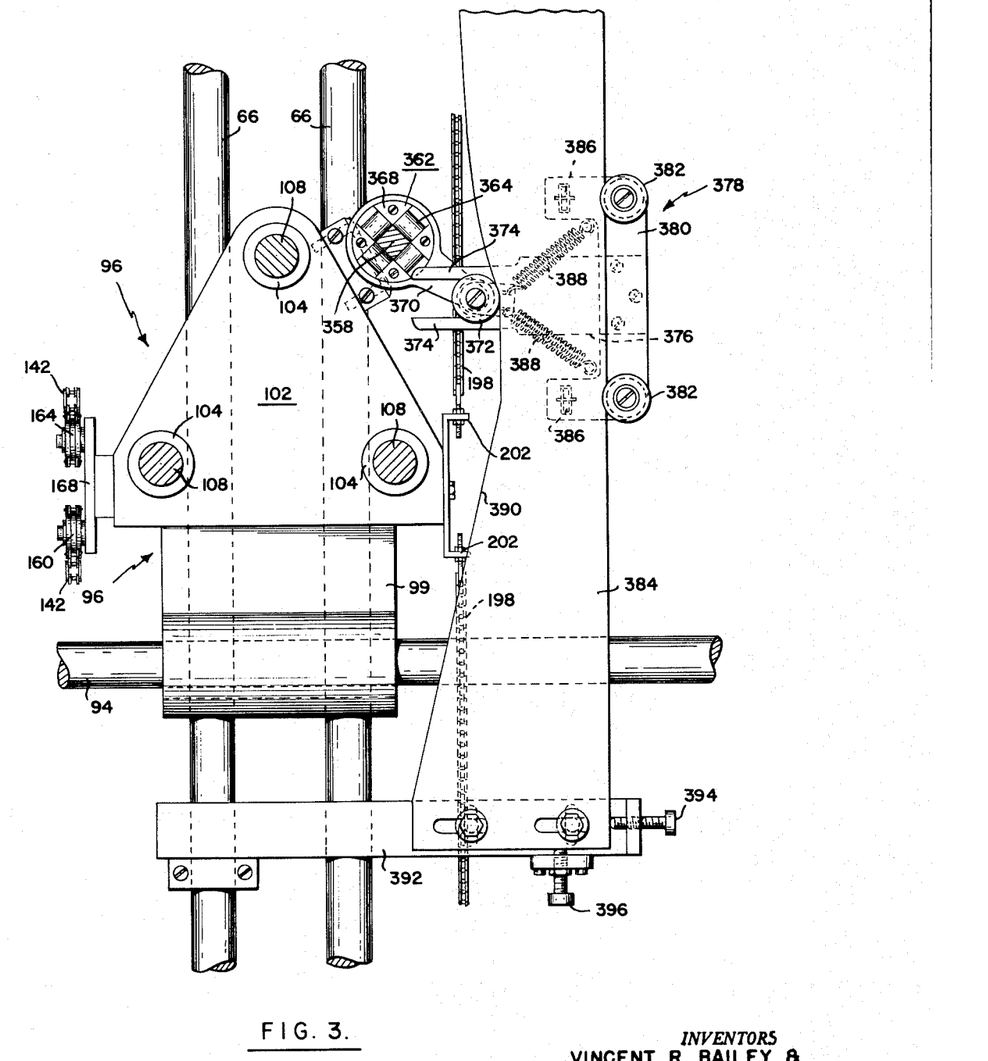
FIGURE 3 is an enlarged fragmentary vertical section on the plane indicated by line 3—3 of FIGURE 2.

Referring particularly to FIGURES 2, 3 and 4, a carriage unit, generally designated 96, is provided with a part 98 having upright laterally spaced sleeve bushings (not shown) respectively fitted over the bars 64 and 66. Mounted upon the part 98 are a bearing unit 100 having horizontally extending laterally spaced sleeve bushings (not shown) and a bearing unit 102 having horizontally extending laterally spaced sleeve bushings 104. Affixed to the front of the part 98 is a bearing 95 having a horizontally extending sleeve bushing 97 fitted over the associated bar 94, and affixed to the rear of the part 98 is a bearing 99 having a horizontally extending sleeve bushing 101 fitted over the associated bar 94.

Referring particularly to FIGURES 2, 3, 4 and 5, a carriage unit, generally designated 106, is provided with a set of three horizontally extending laterally spaced bars 108 extending through the bearing units 100 and 102. The fore end portions of the bars 108 are connected together by a header member 110 while the rear end portions of the bar 108 are connected together by a header member 112.

Referring particularly to FIGURE 1, an anchor bar 114 is affixed to the carriage unit 96. One end portion of a cable 116 is secured to the bar 114 and is trained over a pulley 118 mounted upon a bracket 119 affixed to the part 62. The cable 116 is also trained over a pulley 120 mounted upon a bracket 121 affixed to the side frame 20. From the pulley 120 the cable 116 extends downwardly and under a pulley 122, from whence it extends upwardly to a plate 124, by means of which it is anchored to the side frame 20. Depending from the pulley 122 is a counterweight 126. Also affixed to the bar 114 is a cable 128 which is trained over a pulley 130 mounted upon the bracket 119. The cable 128 is also trained over a pulley 132 mounted upon a bracket 133 affixed to the side frame 18. From the pulley 132 the cable 128 extends downwardly and under a pulley 134, from whence it extends upwardly to a plate 136, by means of which it is anchored to the side frame 18. Depending from the pulley 134 is a counterweight 138.

Referring particularly to FIGURE 2, anchored to part 62, as at 140, is a chain 142, which extends downwardly from part 62 to a pulley 144. The chain then passes under the pulley 144 and extends forwardly to loop about a pulley 146. Then it passes over a pulley 148 and downwardly to a pulley 150. The chain then passes under the pulley 150 and extends forwardly over a pulley 152. From the pulley 152 the chain loops about a sprocket 154 and then passes over a pulley 156 and under a pulley 158. From the pulley 158 the chain extends upwardly to a pulley 160. The chain then passes over the pulley 160 and extends rearwardly to loop about a pulley 162. Then it passes under a pulley 164 and extends upwardly to the part 62, to which it is anchored as at 166. The pulleys 144, 148, 160 and 164 are mounted upon a plate 168 affixed to the carriage unit 96. The pulleys 146 and 162 are mounted respectively upon the header members 110 and 112. The pulleys 150, 152, 156 and 158 are mounted upon a plate 170 affixed to the part 42.

Referring particularly to FIGURES 2 and 7, overlying the short arm 48 of the Z-shaped plate 43 is a horizontally extending shaft 172 having axially spaced portions journalled in bearings 174 affixed to the Z-shaped plate. Affixed to one end portion of shaft 172 is a sprocket 176 over which is trained a chain 178. This chain is also trained over a sprocket 180 affixed to a shaft 181 having opposite end portions journalled respectively in bearings 182 carried by the arm 50. Overlying the upper run of the chain is a guide roller 184 also carried by the arm 50. At the fore end of the arm 50 is a suitably mounted roller 186 about which the chain is trained. The opposite end portions of the chain are anchored to a plate 188 by means of elements 190, which extend freely through a slot 191 in the arm 50. The plate 188 embraces the arm 50 and mounts a knob 192.

Referring to FIGURES 1, 4 and 13, mounted upon the part 62 is an electric motor and change speed unit 194. The output shaft of this unit mounts a chain sprocket 196 over which is trained a chain 198 that depends therefrom and is trained about a sprocket 200 mounted upon a shaft 201 carried by the part 42. The opposite end portions of the chain 198 are anchored to the carriage 96, as at 202.

Referring particularly to FIGURES 1, 2, 6 and 14, mounted upon the header member 110 are a pair of laterally spaced brackets 204 which carry a projector assembly, generally designated 206. This assembly comprises a casing having a cylindrical top 208 and a rectangular bottom 210. The bottom 210 comprises a horizontally extending upper wall 212 from which depend front and rear walls respectively designated 214 and 216 and two opposite side walls 218. Disposed in lower spaced relation to the upper wall 212 is a horizontally extending lower wall 220. Depending from the bottom 210 is a bellows 222 carrying a mount 224 for a lens 226. The plate 220 is provided with a rectangular opening 228. Overlying the plate 220 and extending along the opposite side walls 218 of the bottom 210 respectively are a pair of guide plates 230. The front wall 214 of the bottom 210 is slotted, as at 231, for receiving a shutter 232 having a bar 234 affixed to one end thereof, and the rear wall 216 of the bottom 210 is slotted, as at 235, for receiving a shutter 236 provided with a recess 238 and fitted with a pair of bars 240 respectively on opposite sides of the recess 238. The plate 220 is extended through the slot 231 forwardly beyond the front wall 214 of the bottom 210, as at 242. It is also extended through the slot 235 rearwardly beyond the rear wall 216 of the bottom 210, as at 244, being set back from the header member 110 to provide an opening 246. The plate 212 is provided with an upwardly extending flange 248 abutting the header member 110. The extension 244 of the plate 212 is provided with a generally rectangular opening 250.

Secured to one side of the bottom 210 is a bracket 252, which mounts an electric motor 254. The shaft of the motor mounts a sprocket 256 over which is trained a chain 258. This chain is also trained over a sprocket 260 mounted upon a horizontally extending shaft 262 journalled in bearings 264 affixed to plate 212. Affixed to the shaft 262 is a sprocket 266 over which is trained a chain 268. This chain is also trained over a sprocket 270 mounted upon a horizontally extending shaft 272 having opposite end portions journalled in bearings 274 affixed to plate 212. The shaft 272 mounts a roller 276 underlying which is an opening 278 formed in the extension 244 of the plate 220. Underlying the roller 276 is a second roller 280 which is carried by a shaft 282 journalled in brackets 284 affixed to the underside of the extension 244 of the plate 220.

Disposed on opposite sides of the bottom 210 are a pair of chains 286. The bar 234 has opposite end portions attached respectively to the upper runs of the chains 286, and the bars 240 are secured respectively to the lower runs of the chains 286. Each chain is trained over a sprocket 288 carried by the header member 110 and also over a sprocket 290 carried by an end portion of a shaft 292. The shaft 292 is journalled in a pair of bearings 294 affixed to the extension 242 of the plate 220. One end portion of the shaft carries a sprocket 296 over which is trained a chain 298. This chain is also trained over a sprocket 300 carried by a pintle 302 affixed to a bracket 304, which bracket is secured to the bottom 210. Affixed to the sprocket 300 is a hand wheel 306. At the fore end of the bottom 210 is a film magazine 308 and at the rear end of the bottom 210 is a film magazine 310.

Figure 5:
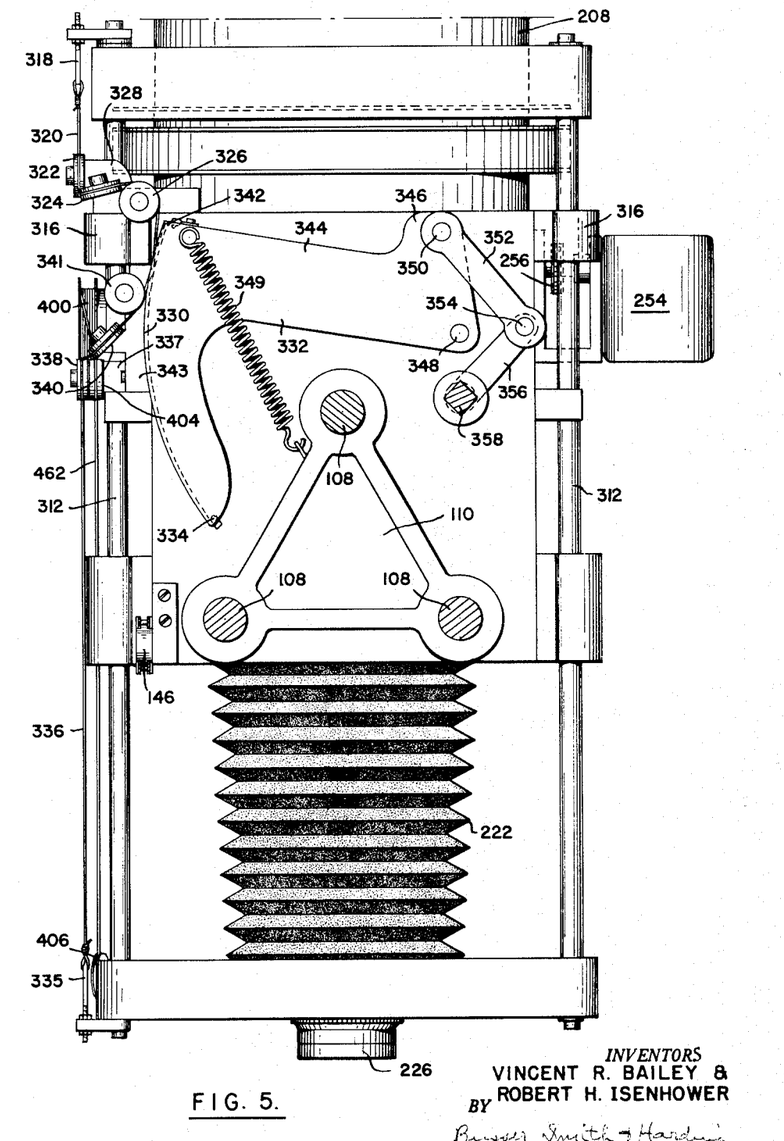
FIGURE 5 is an enlarged vertical section on the plane indicated by line 5—5 of FIGURE 2.
Figure 6:
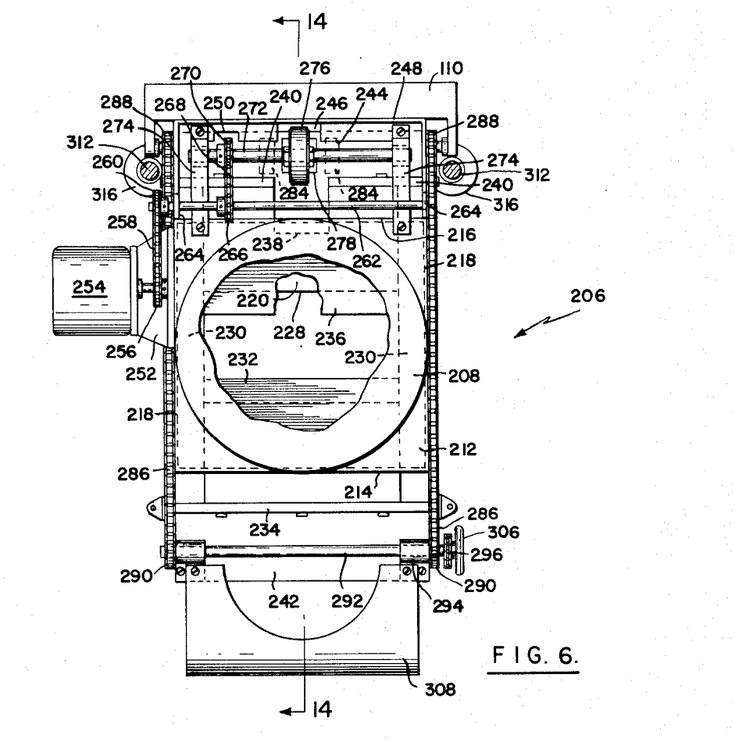
FIGURE 6 is an enlarged horizontal section on the plane indicated by line 6—6 of FIGURE 2.

Referring particularly to FIGURES 2 and 5, each one of a pair of laterally spaced upright bars 312 is slidably projected through a pair of sleeves 314 and 316. Anchored to the upper end of one of said bars, as at 318, is a cable 320 which cable is trained over a series of pulleys 322, 324 and 326 carried by a bracket 328 mounted upon the header member 110. The cable extends along an arcuately shaped surface 330 of a bell crank 332, to which it is anchored, as at 334. Affixed to the lower end portion of the bar 312, as at 335, is a cable 336, which is trained over a pulley 338 carried by a bracket 337 mounted upon the bottom 210, and over a pair of pulleys 340 and 341 carried by a bracket 343 mounted upon the header member 110. The cable extends over the arcuate surface 330 of the bell crank and is anchored thereto, as at 342.

Referring particularly to FIGURES 2, 3, 4 and 5, the arcuate surface 330 of the bell crank is formed at the end of an arm 344, the other arm of the bell crank being designated 346. The bell crank is pivoted, as at 348, and is spring biased, as at 349, in a counterclockwise direction, as viewed in FIGURE 5. The bell crank arm 346 carries a pivot 350 to which is attached a link 352. The opposite end of the link 352 is attached to a pin 354 carried by an arm 356 extending laterally from a horizontally extending shaft 358. This shaft is square in transverse section and has opposite end portions journalled respectively in the header member 110 and a bracket 360 carried by the header member 112. Embracing the shaft 358 is a roller unit, generally designated 362. The roller unit is provided with a set of four rollers 364 respectively engaged with the sides of the shaft 358. The rollers are journalled in bearings 368 and the entire unit is turnably mounted in one end portion of an arm 370. The opposite end portion of the arm 370 mounts a roller 372 which is adapted to move between two fingers 374 of a plate 376 carried by a carriage, generally designated 378. The carriage comprises a plate 380 to which the plate 376 is attached, a pair of rollers 382 which travel over the edge of an upright plate 384, and a pair of rollers 386 which travel over the face of the plate 384. A pair of tension springs 388 anchored to the carriage 378 and to the arm 370 serve to keep the roller 372 in engagement with a cam surface 390 formed on the plate 384. The plate 384 is mounted upon a bracket 392 which is affixed to the upright guide bars 66. A pair of adjusting screws 394 and 396 are provided for adjusting the position of the plate 384.

Referring particularly to FIGURE 2, secured to the side of the projector casing is a reverse wound non-cumulative force spring motor 398 of the type described in United States Patent No. 2,063,799, issued December 8, 1936, and employing a non-cumulative force spring as disclosed in United States Patent No. 2,609,192, issued September 2, 1952. The motor is provided with a drum 400 from which there extends a cable 402 trained around a pulley 404 mounted upon the bracket 337 and a pulley 406 carried by the lens mount 224, being anchored to the projector casing, as at 408.

Referring to FIGURES 1, 7, 8, and 9, extending horizontally fore and aft of the apparatus are a pair of shafts 410, each of which has opposite end portions journalled respectively in a pair of bearings 412 and 414 affixed to the top 12. Corresponding rear end portions of the shafts 410 respectively mount a pair of sprockets 416 over which is trained a chain 418. Associated with this chain is a pneumatic motor, generally designated 420, which motor is provided with a piston 422 working in a cylinder 424. The piston 422 is connected to one run of the chain 418, as at 426. The motor 420 is mounted upon a bracket 428 and the terminal portion 430 of the piston rod is slidably received in a lug 432 and is adapted to engage an adjustable stop 434. Each shaft 410 is provided with a pair of cams 436.

Figure 8:
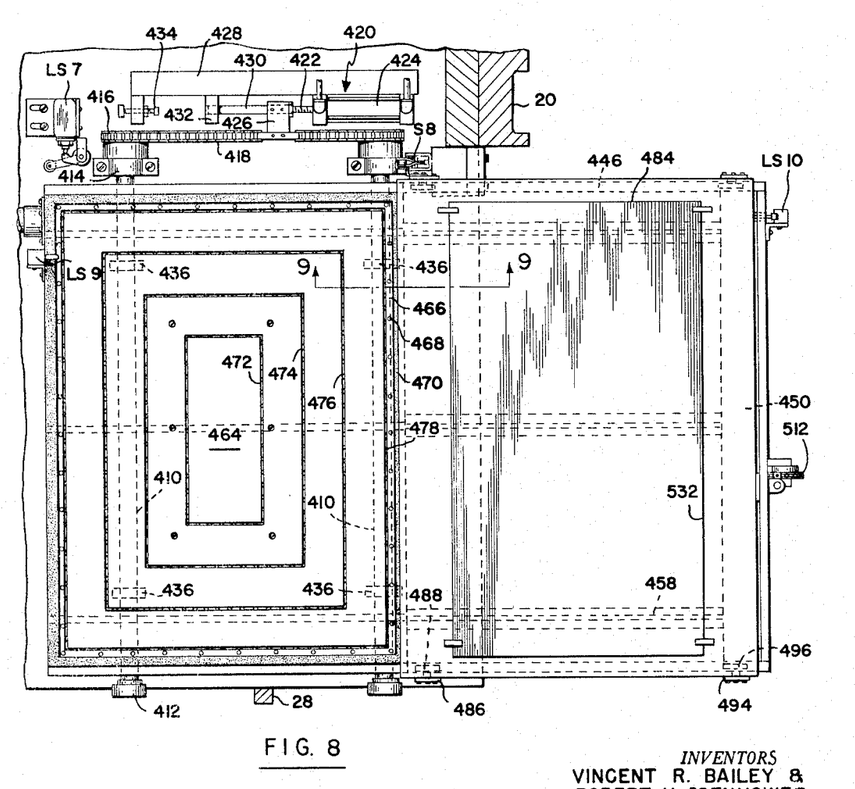
FIGURE 8 is an enlarged horizontal section on the plane indicated by line 8—8 of FIGURE 1, showing the cover of the machine in open position.
Figure 9:
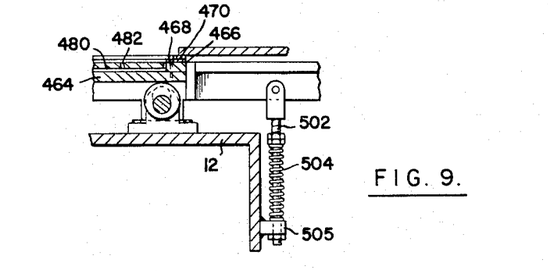
FIGURE 9 is an enlarged vertical section on the plane indicated by line 9—9 of FIGURE 8.

The apparatus is provided with a horizontally extending frame, generally designated 438, which frame is generally rectangular in shape. The frame is provided across the front and rear respectively with members 444 and 446 and along opposite ends thereof respectively with members 448 and 450. Extending fore and aft of the frame, between the member 448 and 450 is a member 452. Extending between members 448 and 452 are a pair of laterally spaced members 454 and 456, and disposed between the members 452 and 450 are three laterally spaced members 458, 460 and 462.

Fitted into the space defined by the frame members 444, 446, 448 and 452 and extending over the frame members 454 and 456 is a plate member 464. Overlying the marginal portions of the plate 464 is a thin spacer strip 466 secured in position by screws 468. Overlying the strip 466 is a gasket 470. The plate 464 is provided with four grooves 472, 474, 476 and 478 formed in the top thereof. It is also provided internally with passages 480 communicating with the grooves aforesaid by means of a multiplicity of openings 482.

The frame is provided with a cover, generally designated 484, fitted with a pair of brackets 486 which mount rollers 488 adapted to work in grooves 490 formed in the frame members 444 and 446, the grooves being provided with vertical extensions 492. The cover is also fitted with a pair of brackets 494 which mount rollers 496 adapted to work in grooves 498 formed in the frame members 444 and 446, the grooves being provided with vertical extensions 500. Depending from the frame are a pair of rods 502, each of which has fitted thereover a compression spring 504, the lower end of which is seated upon a lug 505 affixed to the top 12.

The cover 484 is secured as by a pin 506 to a chain 508, which chain is trained over a sprocket 510 and a sprocket 512. The sprocket 510 is mounted upon a shaft 514 which also carries a sprocket 516. Over the sprocket 516 is trained a chain 518, which is also trained about a sprocket 520. The sprocket 520 is mounted upon the output shaft 522 of a speed reducer 526, the latter being associated with a motor 528 carried by a bracket 530.

Figure 12:
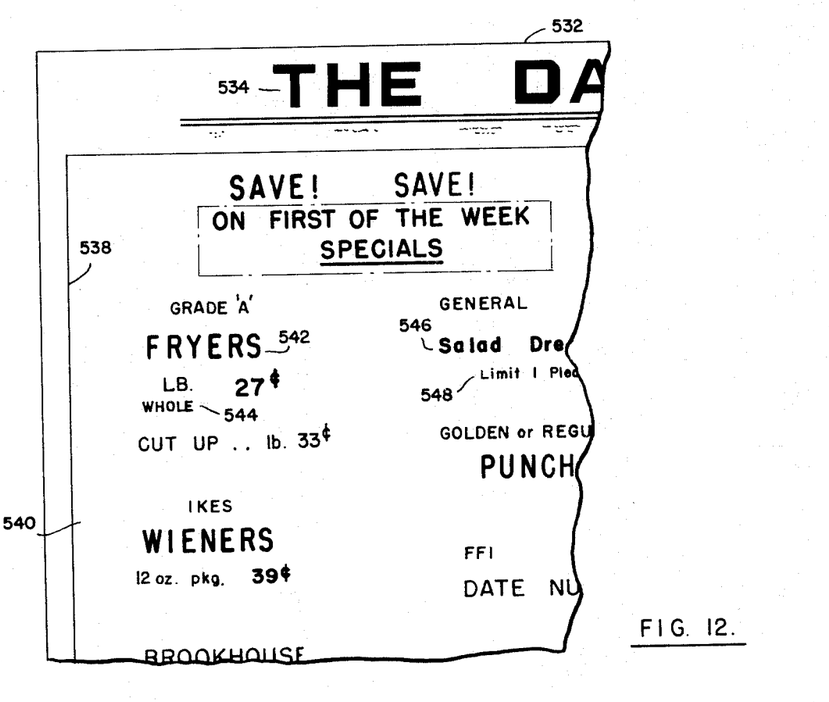
FIGURE 12 is a view of an artist's layout.

Referring particularly to FIGURE 12, the artist's layout 532 may, for example, include an underscored heading 534. A border 538 extends about the advertisement, generally designated 540, which includes upper case print, as, for example, the word "Fryers," designated 542; upper case print smaller in size, as, for example, the word "Whole," designated 544; lower case print, as, for example, the words "salad dressing," designated 546; and lower case print smaller in size, as, for example, the words "Limit 1 please," designated 548.

Figure 11:
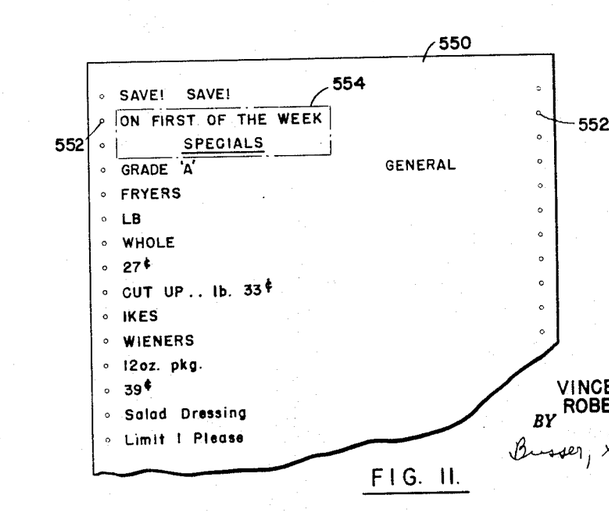
FIGURE 11 is a view of a photosetter's film negative.

Referring particularly to FIGURE 11, the photosetter's negative, designated 500, is provided with a series of holes 552 on each side thereof. The printing to be projected appears on the negative, and it will be noted that in preparing the negative the size of the printing on the artist's layout is ignored, i.e., only one size of type is set at the photosetting machine. While all printing appearing on the negative is the same size, for example, eight point, the style of the printing must correspond character for character with that of the artist's layout. Thus it will be apparent that one and the same photosetting machine may be used for a wide range of type sizes called for by the artist, but the operator must change fonts of type each time the artist calls for a different style of type. Each line of the negative contains only what is to be projected at one and the same time. If more than one line are to be projected simultaneously, each must be suitably centered relative to the others, as illustrated within the rectangle 554 encompassing the printing in the second and third lines.

In the operation of the machine, first the artist makes a layout of the advertisement, for example, an advertisement for a newspaper page, as illustrated in FIGURE 12. Then the photosetter makes a negative from the artist's layout, as illustrated in FIGURE 11. The artist's layout 532 is taped to the top of the cover 484, as shown in FIGURE 8. The photosetter's negative is threaded foot first between plate 220 and shutters 232 and 236, between rollers 276 and 280, and through opening 246, whereupon motor 254 is operated to actuate roller 276 through the chain 258, shaft 262, chain 268 and shaft 272. Thus the negative is loaded into magazine 310. When the head of the negative is in the projection area, i.e., the area between shutters 232 and 236, operation of motor 254 is terminated.

Assuming that the word "Fryers" is to be projected, the shutters are adjusted for one line projection by manipulating hand wheel 306. The hand wheel and sprocket 300 turn together, actuating chain 298, whereupon sprocket 296, shaft 292 and sprockets 290 are actuated and chains 286 turn sprockets 288. Thus the shutters may be adjusted as required to make the opening between the shutters of the required size.

The negative is now fed from the magazine 310 in print direction, i.e., toward the magazine 308, by reversing the motor 254. When the word "Fryers" is in registry with the opening between the shutters, operation of the motor is terminated. Now a work light (not shown) is turned on, and the projector is focused in the manner to be described so that the projected word "Fryers" registers with the word "Fryers" on the artist's layout.

In focusing the projector, the knob 192 is manually moved fore and aft until the projected line registers with the corresponding line on the artist's layout. When the knob is moved fore and aft, the plate 188 slides along the arm 50, actuating the chain 178, shaft 172 and chain 142.

Referring particularly to FIGURE 2, one horizontally extending loop of the chain 142 is lengthened and simultaneously the other horizontally extending loop is shortened, whereupon the carriage unit 106, which mounts the projector assembly 206, is moved fore or aft, the bars 108 sliding in bearing units 100 and 102. At the same time, the shaft 358 moves axially relative to the roller unit 362, the rollers 364 respectively working over the surfaces of the shaft 358.

The projected line being in registry (lengthwise of the artist's layout) with the corresponding line on the artist's layout, the knob 192 is now moved manually crosswise of the machine till the projected word and the corresponding word on the artist's layout register crosswise of the artist's layout. When the knob is moved as aforesaid, the carriage unit 32 slides along the several bars 24, 26 and 54 and carries with it the carriage units 96 and 106. The carriage unit 96 slides along the bars 94. The chain 72 and the cable 78 respectively trained over the sprockets 74 and pulleys 80 and tied together at 82 make movement of the carriage 32 smooth.

The projector assembly 206 is now moved vertically in order to make the size of the projected letters correspond with the size of the letters on the artist's layout. This is effected by actuation of electric motor 194 as required to actuate chain 198. When the chain 198 is actuated, the carriage unit 96 moves vertically, sliding on the bars 64 and 66, and carrying with it the carriages 86 and 106. The weight of the vertically movable assembly is balanced by counterweights 126 and 138.

As the carriage unit 96 moves vertically, the roller 372 works on the cam 390, and the carriage 378 moves up and down on the plate 384. Thus the arm 356 affixed to the shaft 358 rocks about the axis of the shaft. As a result the link 352 actuates the bell crank, rocking it about the pin 348. The bars 312, through the cables 320 and 336, are shifted axially, raising or lowering the bellows 222 relative to the header member 110. Thus, by moving the projector assembly 206 vertically as a whole and by varying the effective length of the bellows and lens, the size of the projected letters is varied as desired. For example, typically, the projected characters may range from one to eight times the size of the characters on the negative. The range may be increased by a suitable change of readily available lenses. The projected image and the corresponding portion of the artist's layout now registers letter for letter in size, position and type of print. The spring motor 398, of course, supports the bellows 222 and lens 226, the cable 402 being extended and reeled in as the bars 312 are shifted axially. The work light is no longer needed, and therefore is turned off, either manually or automatically, in which latter event it is controlled by movement of the vacuum board cover.

Now the motor 528 is operated to actuate chain 508 through chain 518 and shaft 514. Thus the cover 484 is shifted from its closed position, shown in FIGURE 7, to its open position, shown in FIGURE 8. When the cover starts to move toward its open position, pneumatic motor 420 automatically operates to actuate the several cams 436 through chain 418 and shafts 410. Thus the frame 438 rises, positioning the plate 464 with its upper surface at an elevation corresponding to that of the cover when the latter is in closed position.

A sheet of sensitized paper (not shown) is now fitted to the plate 464, and vacuum is applied through passages 480 and openings 482 to hold the paper in position. The exposure lamp is now turned on, whereupon the image to be projected is cast upon the sensitized paper, and after a predetermined time, the exposure lamp automatically goes off again. It will be understood that the procedure outlined hereinbefore is repeated over and over again until each line of the advertisement has been projected to the sensitized paper. It should be noted, however, that instead of projecting one line at a time a plurality of lines may be projected simultaneously, for example, the two lines enclosed by the rectangle 554, FIGURE 11. After each projecting operation, the cover automatically returns to closed position and the pneumatic motor 420 automatically operates to relower the frame 438 to its initial position. Finally vacuum is removed so that the sensitized sheet of paper may be removed from the plate 464 and developed for use in making engravings.

Figure 10:
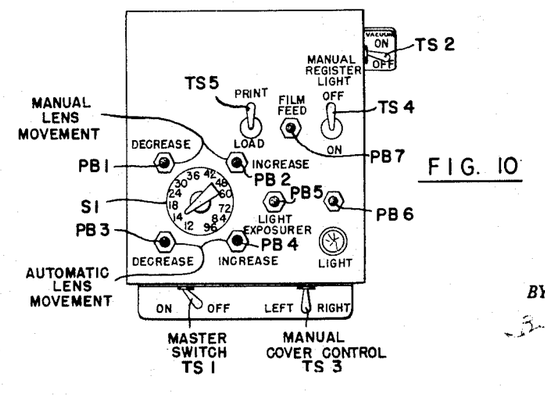
FIGURE 10 shows a control panel.
Figure 15:
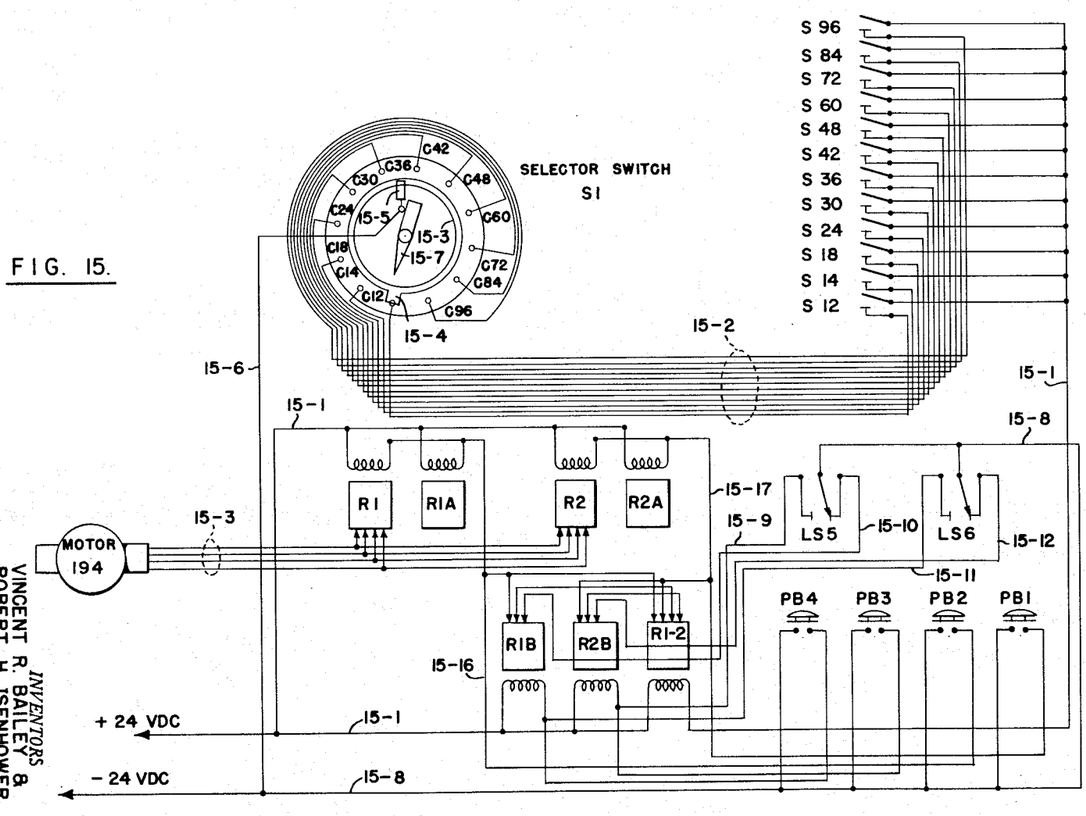
FIGURE 15 is a schematic diagram of the control circuitry for automatically setting the vertical position of the projector.

Referring particularly to FIGURE 15, the control circuit for vertically positioning the projector comprises a set of stop switches S12, S14, S18, S24, S30, S36, S42, S48, S60, S72, S84 and S96, of which only a few are shown arranged in vertical array, on the left side of the machine, as viewed in FIGURE 4. Associated with these stop switches is a selector switch S1, which is shown in FIGURE 10 on a control panel. The circuit also includes a set of relays respectively designated R1, R1A, R1B, R2, R2A, R2B, and R1–2. The circuit further includes a set of push button switches P1, P2, P3 and P4, which are shown on the control panel, FIGURE 10. These switches are single pole switches, P3 and P4 being momentary contact switches. Associated with R1B and R2B are a pair of SPDT limit switches respectively designated LS5 and LS6, which are vertically spaced, on the right side of the machine, as viewed in FIGURE 4. The motor 194 controlled by the circuit is a four lead reversible synchronous speed motor.

The coils of R1 and R1A are parallel with one another and, through a lead 15–16, in series with PB2 across a D.C. supply lead 15–1 and a D.C. return lead 14–8. The coil of R1B is connected in series with PB4 across leads 15–1 and 15–8. The coils of R2 and R2A are parallel with one another, and through a lead, 15–17, in series with PB1 across leads 15–1 and 15–8. The coil of R2B is connected in series with PB3 across leads 15–1 and 15–8. The coil of R1–2 is adapted to be connected in series with any one of the stop switches and its corresponding selector switch contacts, C12, C14, C18, C24, C30, C36, C42, C48, C60, C72, C84 or C96, across the leads 15–1 and 15–8. The leads connecting the stop switches with the selector switch are designated 15–2. The selector switch is provided with a contact ring 15–3, which has a radial extension 15–4. The pointer of the selector switch, designated 15–7, may be turned to bring the extension 15–4 selectively into engagement with the contact points of the selector switch. The contact ring 15–3 is connected to lead 15–8 through a lead 15–6 and a stationary element 15–5, which slidably engages the ring.

The normally open contact of LS5 is connected by a lead 15–9 to the low potential end of the R2B coil, while the normally closed contact of LS5, is connected by a lead 15–10 to the switch section of R1B. The normally open contact of LS6 is connected by a lead 15–11 to the low potential end of the R1B coil, while the normally closed contact of LS6 is connected by a lead 15–12 to the switch section of R2B. The switch arms of LS5 and LS6 are connected to the lead 15–8. The motor 194 is connected by four leads, designated 15–13, through the R1 and R2 switch sections, to a suitable source of A.C.

Assuming that the projector is in an intermediate position, and that it is desired to raise the projector in order to enlarge the projected characters, for example to eighty-four point, the pointer arm 15–7 is turned to a position such that the extension 15–4 of the contact ring 15–3 engages with contact C84. Preferably, PB4 is depressed, whereupon it makes momentary contact. The R1B coil is energized, and through the R1B switch section the R1 and R1A coils are energized. When R1B operates, a circuit (not shown) is set up to hold R1 and R1A after PB4 reopens. When R1 operates, the motor leads 15–13 are suitably connected to the source of A.C. through the R1 switch section, the motor 194 operates and the projector rises. When the projector reaches the desired position, the stop switch S84 is mechanically closed by trip means, indicated at 15–14, FIGURE 4. Thus the R1–2 coil is energized and the R1–2 switch section operates to open the holding circuit set up by R1B, whereupon R1 and R1A are deenergized and current is cut off from the motor. R1A, deenergized simultaneously with R1, acts to deliver to the motor D.C. for braking it, in consequence of which the projector may be stopped to within five one-thousandths of an inch of the desired position.

If, now, it is desired to lower the projector in order to decrease the size of the projected characters, for example to sixty point, the arm 15–7 is turned to bring the extension 15–4 into engagement with contact C60. Preferably, PB3 is depressed, whereupon R2, R2A and R2B operate to lower the projector, in the same way as R1, R1A and R1B operate to raise the projector. When the projector reaches the desired position, the trip 15–14 closes stop switch S60, whereupon the R1–2 coil is energized, R1–2 opens a holding circuit set up by R2B, R2 cuts current off from the motor and R2A supplies D.C. for braking the motor.

If, when it is desired to raise the projector, PB3 is depressed instead of PB4, the projector descends first, then automatically reverses and rises to the desired position. At the limit of the downward excursion, LS6 is mechanically operated by trip means, indicated at 15—15, whereupon the circuit held by R2B is opened and R1B is energized, reversing the motor. If, when it is desired to lower the projector, PB4 is depressed instead of PB3, the projector rises first, then automatically reverses and descends to the desired position. At the limit of the upward excursion, LS5 is operated by trip 15—15, whereupon the circuit held by R1B is opened and R2B is energized, reversing the motor.

The projector may be brought to any desired position within the range of its movement by depressing PB2 to raise the projector or depressing PB1 to lower the projector, the motor operating to raise the projector as long as PB2 is depressed and operating to lower the projector as long as PB1 is depressed. Thus odd sizes of projected characters may be obtained so that the copy may fit the space called for by the artist.

Figures 16, 17:
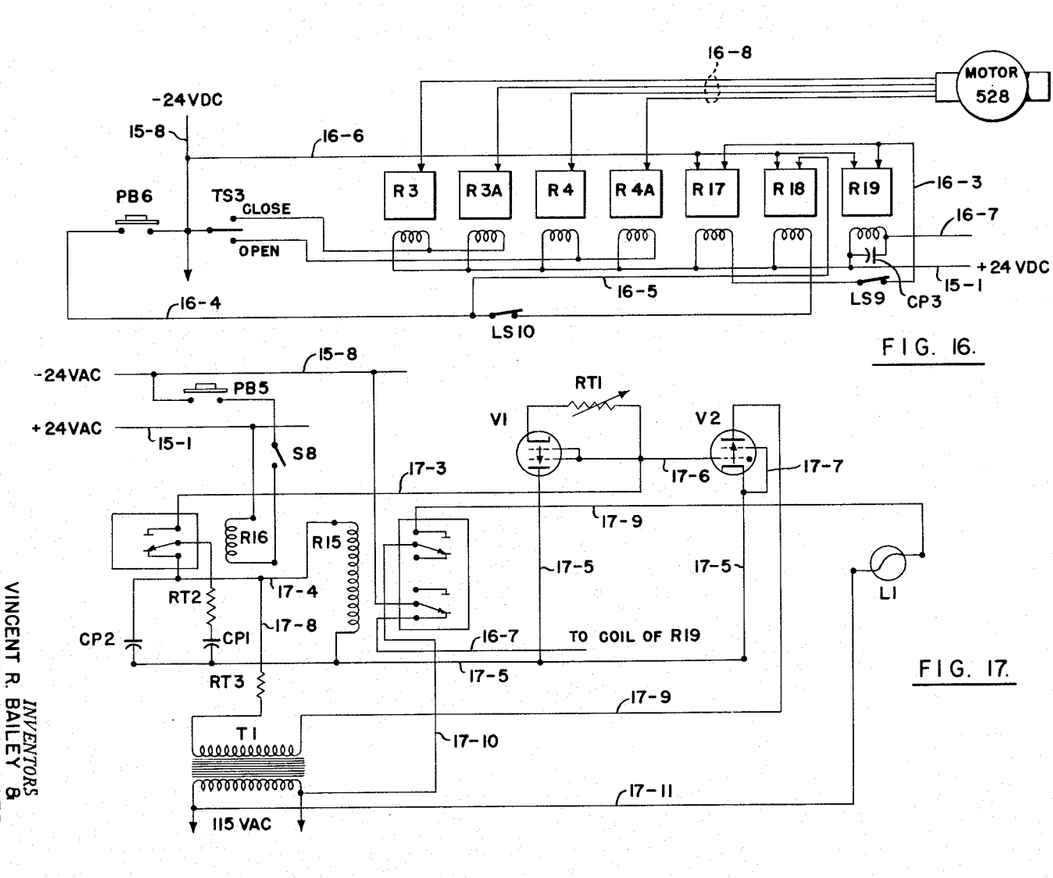
FIGURE 16 is a schematic diagram of the control circuitry for automatically positioning the cover plate.
FIGURE 17 is a schematic diagram of the control circuitry for actuating the exposure lamp.

Referring particularly to FIGURE 16, the control circuit for actuating the cover 484 comprises a set of relays respectively designated R3, R3A, R4, R4A, R17, R18 and R19. The circuit also includes a SPDT momentary contact toggle switch TS3 with center off position, which is shown on the control panel, FIGURE 10, and a single pole push button momentary contact switch PB6, which is shown on the control panel, FIGURE 10. The circuit further includes a pair of single pole limit switches respectively designated LS9 and LS10, which are shown at opposite ends of the frame 438, FIGURE 8. The motor 528 controlled by the circuit is a four lead reversible synchronous speed motor.

When TS3 is closed in the open direction, the R4 and R4A coils, parallel with one another, are connected in series with TS3 across the D.C. supply lead 15–1 and the D.C. return lead 15–8. When TS3 is closed in the closed direction, the R3 and R3A coils, parallel to one another, are connected in series with TS3 across the leads 15–1 and 15–8. The low potential end of the R17 coil is connected through LS9, by a lead 16–3, to normally open contacts in the R17 and R19 switch sections. The R18 coil, LS10 and PB6 are connected in series across the leads 15–1 and 15–8 by a lead 16–4. Connected to the lead 16–4, between PB6 and LS10, is a lead 16–5, which extends to normally open contacts of the R18 switch section. Armatures of the R17, R18 and R19 switch sections are connected to lead 15–8 by a lead 16–6. The low potential end of the R19 coil is connected by a lead 16–7 to normally closed contacts of a relay R15 of the automatic timer circuit for the exposure lamp, to be described hereinafter. The motor 528 is suitably connected by leads 16–8, through the R3, R3A, R4 and R4A switch sections to a source of A.C.

Assuming that the cover 484 is closed, and that it is desired to open the cover, PB6 is depressed, whereupon the R18 coil is momentarily energized and a holding circuit (not shown) is set up for a purpose to appear. Now TS3 is closed in the open direction, whereupon the R4 and R4A coils are energized. The holding circuit set up by R18 holds the R4 and R4A coils energized when the contacts of TS3 reopen. When R4 and R4A operate, the motor leads 16–8 are connected to the source of A.C. through the R4 and R4A switch sections, the motor 528 operates and the cover 484 opens. When the cover reaches the end of its excursion, LS10 is opened, whereupon the R18 coil is deenergized, the holding circuit opens, and the R4 and R4A coils are deenergized. Thus current is cut off from the motor 528. Preferably, D.C. is delivered to the motor 528 for dynamically braking the same.

Referring particularly to FIGURE 17, the control circuit for the exposure light comprises a pair of relays R15 and R16. R15 is provided with a SPDT switch section, while R16 is provided with a DPDT switch section. The circuit is also provided with a transformer T1, a pair of tubes V1 and V2, a pair of capacitors CP1 and CP2, a variable resistor RT1, a pair of fixed resistors RT2 and RT3 and a lamp L1. Connected in the circuit are a SP switch S8, which is shown in FIGURES 7 and 8, and a SP push button switch PB5, which is shown on the control panel, FIGURE 10.

PB5, S8 and the R16 coil are connected in series across the leads 15–1 and lead 15–8. A normally open contact of the R16 switch section is connected by a lead 17–3, through RT1, to the cathode of V1, while normally closed contacts of the R16 switch section are connected by leads 17–4 and 17–5, through the R15 coil, to the plate of V1 and the cathode of thyratron V2. The closed contacts of the R16 switch section, RT2 and CP1 are connected in series with one another and in parallel with CP2 across the leads 17–4 and 17–5. The grids of V1 are tied to the cathode of V1 and to one of the grids of V2 by a lead 17–6, as shown. The other grid of V2 is tied to the cathode of V2 by a lead 17–7, as shown. RT3, the R15 coil, and V2 are connected in series across the secondary of T1 by leads 17–8, 17–4, 17–5, and 17–9. The R15 switch section and L1 are connected in series across the primary of T1.

During the positive half of each cycle, V2 conducts, the pulsing D.C. supplied to the R15 coil being sufficient to hold the normally closed contacts of the R15 switch section closed. The capacitors CP1 and CP2, of course, are charged. Assuming that the cover 484 is open, at which time S8 is closed, the operator depresses PB5, whereupon the R16 coil is energized and the normally open contacts close. CP1 now begins to discharge through V1. The high bias thus placed on the grid of V2 cuts off V2, whereupon the R15 coil is deenergized and the normally open contacts close. The exposure light goes on and stays on for a period of time determined by the time constant of the circuit, which is varied as desired by adjusting RT1. When the bias on the grid of V2 returns to normal, V2 begins to conduct again, reenergizing the R15 coil, whereupon the normally closed contacts reclose, and the lamp L1 goes off.

Now referring to FIGURES 16 and 17, D.C. is supplied through normally closed contacts of the R15 switch section to the R19 coil, which has a capacitor CP3 across it. When the R15 coil is deenergized and L1 goes on, the normally closed contacts of the R15 switch section open and the R19 coil is deenergized. However, CP3 is operative to delay the opening of normally closed contacts of the R19 switch section until after expiration of the desired exposure period, whereupon the normally closed contacts of the R19 switch section open and normally open contacts of the R19 switch section close. Thus the R17 coil is energized and a holding circuit (not shown) is set up, which circuit energizes the R3 and R3A coils. When R3 and R3A operate, the motor leads 16-8 are connected to the source of A.C. through the R3 and R3A switch sections, the motor 528 operates and the cover 484 recloses. When the cover reaches the end of its excursion, LS9 is opened, whereupon the R17 coil is deenergized, the holding circuit opens and the R3 and R3A coils are deenergized. Thus current is cut off from the motor 528. Preferably, D.C. is delivered to the motor 528 for dynamically braking the same. In addition, the work light may be turned on automatically for the next operation.

Figure 18:
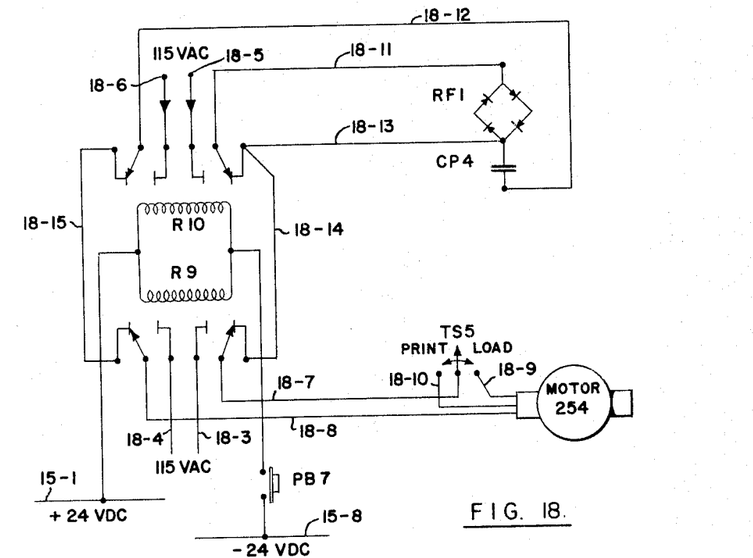
FIGURE 18 is a schematic diagram of the film feed control circuitry.

Referring to FIGURE 18, the film feed control circuit comprises a pair of relays R9 and R10, which have DPDT switch sections. The circuit also includes a half wave rectifier RF1 and a capacitor CP4. The circuit further includes a single pole push button switch PB7 and a SPDT toggle switch TS5 with center off position, which are shown on the control panel, FIGURE 10. The motor 254 controlled by the circuit is a three lead reversible synchronous speed motor.

The R9 and R10 coils are parallel to each other and in series with PB7 across the D.C. supply lead 15-1 and the D.C. return lead 15-8. Open contacts of the R9 switch section are connected by leads 18-3 and 18-4 to the source of A.C., while open contacts of the R10 switch section are connected by leads 18-5 and 18-6 to the source of A.C. The armatures of R9 are connected by leads 18-7 and 18-8 respectively to the arm of TS5 and the motor 254. The open contacts of TS5 are connected by leads 18-9 and 18-10 to the motor 254. One armature of R10 is connected by a lead 18-11 to one side of RF1, while the other armature is connected by a lead 18-12, through capacitor CP4, to the other side of RF1, which side is connected by a lead 18-13 to one set of closed contacts of R10. The latter are connected by a lead 18-14 to one set of closed contacts of R9. The other set of closed contacts of R9 are connected by a lead 18-15 to the other set of closed contacts of R10.

When it is desired to load the projector, the tail end of the film is manually started through the projector, as described hereinbefore. Then TS5 is closed in the load direction, and PB7 is depressed. The R9 and R10 coils are energized when PB7 is depressed, and the normally closed contacts of both switch sections open and the normally open contacts close. Thus A.C. is supplied to motor 254, which runs so long as PB7 is depressed. At the same time, CP4 is charged through RF1. When the head of the film is in the projection area, PB7 is released, whereupon the armatures of R9 and R10 return to their initial positions, and current is cut off from the motor. At the same time CP4 discharges through leads 18-13 and 18-14, supplying motor 254 with D.C. for braking the motor. Now TS5 is closed in the print direction and PB7 is depressed, whereupon motor 254 reverses and feeds the film head first in the opposite or printing direction.

Figure 19:
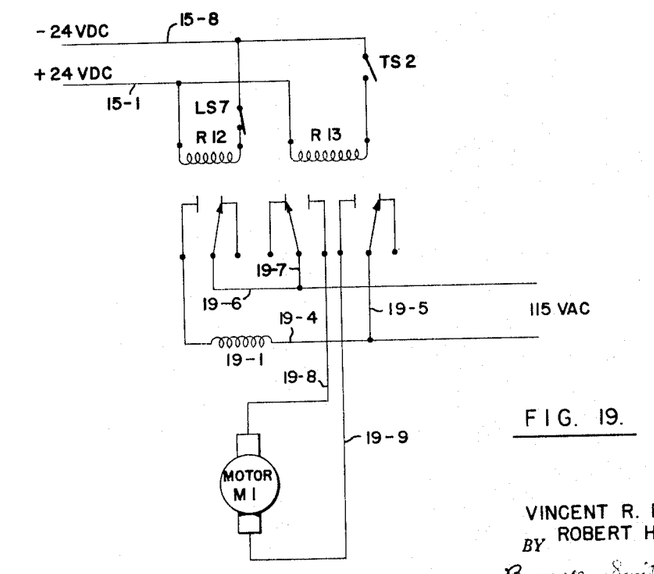
FIGURE 19 is a schematic diagram of the control circuitry for actuating the vacuum pump motor and the pneumatic motor control valve.

Referring to FIGURE 19, the arrangement for controlling vertical movement of the frame 438 and the application of vacuum comprises a pair of relays R12 and R13. R12 has a SPDT switch section, and R13 has a DPDT switch section. The arrangement also includes a SP limit switch LS7, which is shown in FIGURES 7 and 8, and a SP toggle switch TS2, which is shown on the control panel, FIGURE 10. The arrangement further includes the solenoid 19-1 of a valve which controls the supply of air to the pneumatic motor 420. The motor M1 controlled by the circuit runs the vacuum pump (not shown).

The R12 coil is in series with LS7 across the D.C. supply lead 15-1 and the D.C. return lead 15-8, while the R13 coil is in series with TS2 across the leads 15-1 and 15-8. An open contact of the R12 switch section is connected by a lead 19-4, through the solenoid 19-1, to one side of the source of A.C. One of the armatures of the R13 switch section is connected by a lead 19-5 to the lead 19-4. The other armature of the R13 switch section and the armature of the R12 switch section are connected by leads 19-6 and 19-7 to the other side of the A.C. source. The open contacts of the R13 switch section are connected by leads 19-8 and 19-9 to the motor M1.

Normally, the R12 coil is energized, and the R13 coil is deenergized. When the cover 484 begins to open, it opens LS7, whereupon the R12 coil is deenergized and the normally closed contacts open and the normally open contacts close. Thus the solenoid 19-1 is energized and the valve which it controls (not shown) supplies air under pressure to the pneumatic motor 438 for retracting the piston rod 422, whereupon the frame 438 is raised. When the cover returns, it recloses LS7, whereupon the R12 coil is reenergized, the armature of the R12 switch section returns to its initial position, and the solenoid 19-1 is deenergized. Upon deenergization of solenoid 19-1, the valve aforesaid supplies air to the pneumatic motor for again extending the piston rod 422, whereupon the frame 438 is relowered.

When it is desired to apply vacuum, TS2 is closed, whereupon the R13 coil is energized. The normally closed contacts of the R13 switch section open, and the normally open contacts of the R13 switch section close. Thus M1 is supplied with operating current. When TS2 is reopened, the R13 coil is deenergized, the armatures of the R13 switch section return to their initial positions and the operating current is cut off.

Mounted upon the control panel is a toggle master switch TS1 which controls the supply of A.C. and D.C. to the machine. In addition, the panel mounts a toggle switch TS4, which is connected in a control circuit for the work light (not shown).

It will be understood, of course, that the present invention is susceptible of various modifications which may be made without departing from the general principles of the invention. Accordingly, it is intended to claim the same broadly as well as specifically, as indicated by the appended claims.

What is claimed is:

1. A composing machine for accurately reproducing a layout containing symbols of various size on a surface of light sensitive material utilizing a negative containing symbols of size different from but corresponding to those on said layout including,
    means for mounting said layout in a predetermined position, said position defining a finite area in a given plane,
    means for projecting an image of at least some of said symbols from said negative onto said layout,
    said projecting means including means for varying the size of said projected image,
    means for aligning said projected image of said symbols with those on said layout which correspond thereto,
    said means for varying the size of said projected image and said means for aligning said projected image mutually embracing means for mounting said projecting means for movement crosswise and fore and aft and vertically with respect to said finite area, means for interrupting the incidence on said layout of said image in its aligned state, means for removing said layout from said predetermined position and moving said light sensitive surface into said area of said given plane, and means for terminating the interruption of the incidence of said image in its said aligned state which is then reproduced on said surface.

2. The composing machine as claimed in claim 1 further including suction means for removably mounting said surface during movement of said surface into and out of said area of said plane.

3. The composing machine of claim 1 wherein said means for projecting an image includes a lens, and wherein said means for varying the size of said projected image includes means for varying the distance between said lens and said negative upon vertical movement of said projecting means.

4. The composing machine as claimed in claim 1 further including control means for determining the duration of operation of said terminating means and for returning said layout to said predetermined position.

5. The composing machine claimed in claim 1 further including motive power means for successively moving said layout and said surface into and out of said area of said plane and means for controlling the actuation of said power means.

6. The composing machine as claimed in claim 1 wherein said layout overlies said surface when said layout is in said predetermined position.

References Cited in the file of this patent

UNITED STATES PATENTS

| | | |
|---|---|---|
| 2,269,183 | Crumrine | Jan. 6, 1942 |
| 2,537,069 | Lohr | Jan. 9, 1951 |
| 2,687,072 | Lohr | Aug. 24, 1954 |
| 2,780,957 | Libault | Feb. 12, 1957 |
| 2,861,357 | Knutsen | Nov. 25, 1958 |
| 2,915,941 | Finberg | Dec. 8, 1959 |
| 2,930,304 | De Zelar | Mar. 29, 1960 |
| 2,974,579 | Echelson et al. | Mar. 14, 1961 |
| 3,007,369 | Squassoni et al. | Nov. 7, 1961 |
| 3,064,524 | Durst | Nov. 20, 1962 |
| 3,094,050 | Higonnet et al. | June 18, 1963 |
| 3,097,562 | Gurrola et al. | July 16, 1963 |